United States Patent
Zhang et al.

(10) Patent No.: US 10,457,579 B2
(45) Date of Patent: Oct. 29, 2019

(54) REACTOR AND REACTION SYSTEM BASED ON SUPERCRITCAL WATER OXIDATION, AND PHENOLIC WASTEWATER TREATMENT METHOD

(71) Applicant: GUANGZHOU INSTITUTE OF ADVANCED TECHNOLOGY, CHINESE ACADEMY OF SCIENCES, Guangzhou, Guangdong (CN)

(72) Inventors: Fengming Zhang, Guangdong (CN); Chuangjian Su, Guangdong (CN); Jiulin Chen, Guangdong (CN); Jie Yang, Guangdong (CN); Cuijie Jia, Guangdong (CN); Shunquan Chen, Guangdong (CN); Zhenfei Huang, Guangdong (CN)

(73) Assignee: GUANGZHOU INSTITUTE OF ADVANCED TECHNOLOGY, CHINESE ACADEMY OF SCIENCES, Guangzhou (CN)

( * ) Notice: Subject to any disclaimer, the term of this patent is extended or adjusted under 35 U.S.C. 154(b) by 0 days.

(21) Appl. No.: 16/293,703

(22) Filed: Mar. 6, 2019

(65) Prior Publication Data
US 2019/0248685 A1 Aug. 15, 2019

Related U.S. Application Data

(63) Continuation of application No. PCT/CN2017/100593, filed on Sep. 5, 2017.

(30) Foreign Application Priority Data

Sep. 6, 2016 (CN) .......................... 2016 1 0807760

(51) Int. Cl.
*B01J 19/00* (2006.01)
*B01J 19/26* (2006.01)
(Continued)

(52) U.S. Cl.
CPC ............... *C02F 1/727* (2013.01); *B01J 19/26* (2013.01); *C02F 1/02* (2013.01); *C02F 11/086* (2013.01);
(Continued)

(58) Field of Classification Search
CPC .. C02F 1/043; C02F 1/58; C02F 1/727; C02F 2101/345; C02F 2201/003;
(Continued)

(56) References Cited

FOREIGN PATENT DOCUMENTS

| CN | 103951004 A | 7/2014 |
|---|---|---|
| CN | 105130080 A | 12/2015 |

(Continued)

OTHER PUBLICATIONS

Machine translation of CN106219725 A (Dec. 2016) (obtained from Google Patents Aug. 2019) (Year: 2016).*
(Continued)

*Primary Examiner* — Lucas A Stelling (57) ABSTRACT

The present invention relates to the technical field of wastewater treatment. In the present invention, the reactor is provided with a double-shell reactor, a coaxial nozzle, an inner shell structure, evaporated water injection pipes and the like, so it is assured that the wastewater is inject into the reactor at a room temperature and is degraded thoroughly; moreover, with the evaporated water, the corrosion, salt deposition and local overheating in the reactor are prevented, so that the reaction process is guaranteed to be stable and reliable. and through a fuel system, a hydrothermal flame is formed in the reactor, so that the concentrated waste liquid injected into the reactor at the room temperature can
(Continued)

be preheated to a supercritical reaction temperature, and the waste liquid is prevented from coking, scaling and the like in a preheating stage.

6 Claims, 5 Drawing Sheets

(51) Int. Cl.
    *C02F 1/02*     (2006.01)
    *C02F 1/58*     (2006.01)
    *C02F 1/72*     (2006.01)
    *C02F 11/08*     (2006.01)
    *C02F 101/34*     (2006.01)

(52) U.S. Cl.
    CPC ............. *B01J 19/0073* (2013.01); *C02F 1/58* (2013.01); *C02F 2101/345* (2013.01); *C02F 2201/003* (2013.01); *C02F 2201/004* (2013.01); *C02F 2201/005* (2013.01); *C02F 2301/066* (2013.01)

(58) Field of Classification Search
    CPC .......... C02F 2201/004; C02F 2201/005; C02F 2301/066; C02F 11/06; C02F 11/08; C02F 11/086; C02F 1/02; B01J 19/0073; B01J 19/26
    See application file for complete search history.

(56) References Cited

FOREIGN PATENT DOCUMENTS

| | | | |
|---|---|---|---|
| CN | 105130081 A | 12/2015 | |
| CN | 106219725 A | * 12/2016 | ................ C02F 1/04 |

OTHER PUBLICATIONS

International Search Report of PCT Patent Application No. PCT/CN2017/100593 dated Dec. 8, 2017.

* cited by examiner

REACTOR AND REACTION SYSTEM BASED ON SUPERCRITCAL WATER OXIDATION, AND PHENOLIC WASTEWATER TREATMENT METHOD

CROSS-REFERENCE TO RELATED APPLICATIONS

This application is a continuation application of PCT application No. PCT/CN2017/100593 filed on Sep. 5, 2017, which claims the priority of Chinese Patent Application No. 201610807760.2 filed on Sep. 6, 2016. The contents of all of the above are hereby incorporated by reference.

TECHNICAL FIELD

The present invention relates to the technical field of wastewater treatment, and in particular to a reactor and a reaction system based on supercritical water oxidation, and a phenolic wastewater treatment method.

BACKGROUND

A phenolic compound is a compound produced by substituting a hydrogen atom on a benzene ring in an aromatic hydrocarbon with a hydroxyl, and may be divided into a monophenol and a polyphenol according the number of hydroxyls contained in its molecule. The phenolic wastewater is one of the industrial wastewater with large hazard and wide pollution range in the world today and is an important source of water pollution in the environment. In many industrial fields such as coal gas, coking, oil refining, metallurgy, machine manufacturing, glass, petrochemical engineering, wood fiber, chemical organic synthesis industry, plastic, medicine, pesticide and paint, the discharged wastewater contains the phenol. If the wastewater is not treated and is directly discharged to irrigate a farmland, the atmosphere, water, soil and food may be polluted. Along with the improvement of environmental protection requirements, the discharge standard of the phenolic wastewater is ever-increasing. With the phenolic wastewater, the discharge standard is required to be lower than 0.5 mg/L. The conventional organic wastewater treatment technologies (such as a physicochemical treatment technology, a biological treatment technology, wet oxidation and incineration) have the problems of high cost, low degradation rate, easily deviated secondary pollution and the like, and is difficult to meet the requirement of the wastewater treatment.

The supercritical water oxidation is a method with which organic matters are "combusted" and oxidized with air or other oxidants under a high temperature and high pressure condition of being beyond a critical point (PC=22.1 MPa, TC=374° C.) of water. The polarity of the water is a function of a temperature and a pressure and the supercritical water is a non-polar solvent. Under the environment of the supercritical water, the organic matters and the gas may be completely dissolved to each other, a phase interface between gas and liquid phases disappears, a homogeneous phase system is formed and thus the reaction speed is greatly accelerated. Within retention time that is less than 1 minute or even is several seconds, more than 99.9% of organic matters are quickly combusted and oxidized into $CO_2$, $H_2O$ and other nontoxic and harmless final products. The reaction temperature is 400-650° C. generally, so the occurrence of secondary pollutants such as $SO_2$, $NO_x$, and dioxin is prevented. The supercritical water oxidation technology provides a guarantee for complete degradation and treatment of the phenolic wastewater.

At present, the corrosion and salt deposition are two technical problems to promote the supercritical water oxidation technology. The corrosion is mainly attributed to the formation of inorganic acids (such as HCl and $H_2SO_4$) in a supercritical water oxidation process and the reaction condition with a high temperature, a high pressure and a high oxygen concentration. Due to the nearly insoluble characteristic of inorganic salts in the supercritical water, a reactor and a pipeline are blocked. In addition, when materials pass through a heating component such as a heat exchange device or an electrical heater, the organic matters are easily pyrolyzed to produce coke, tar and the like. As the materials are pyrolyzed and coked at a preheating state, it is inevitable that the heat exchange efficiency of the heat exchange device and the electrical heater is greatly reduced. Generally, the wastewater contains the organic salts, which also occurs a salt deposition phenomenon at the preheating state. Because of a high temperature and high pressure reaction process, the materials need to be preheated and pressurized to a supercritical state, which results in the problems of high energy consumption and high cost.

A water membrane reactor is an effective method to comprehensively solve the problems of the corrosion and salt deposition. The reactor generally consists of a pressure-bearing outer shell and a porous inner shell. An organic waste liquid and an oxidant are injected from a top of the reactor to take place a supercritical water oxidative reaction, thus producing a high-temperature reaction fluid. The low-temperature evaporated water is injected into an annular space between the inner shell and the outer shell from a side of the reactor. The evaporated water may balance the pressure of the reaction fluid to the porous inner shell, so that the porous inner shell does not need to bear the pressure and the pressure-bearing outer shell is prevented from contacting the reaction fluid. The evaporated water is permeated into the reactor via the porous inner shell to form a layer of sub-critical water membrane on a porous inner wall. The water membrane can prevent the contact between the inorganic acid and the wall and can dissolve the inorganic salts separated out in a supercritical temperature reaction area, so that the problems of the corrosion and salt deposition in the reactor can be effectively alleviated. Due to the flow field characteristic in the water membrane reactor and injection manner of the evaporated water, the evaporated water is distributed unevenly to cause local corrosion and salt deposition as well as the problem of local overheating (such as a nozzle and an upper portion of the reactor) in the reactor.

SUMMARY

In view of this, it is necessary for the above-mentioned problem to provide a reactor and reaction system based on supercritical water oxidation, and a phenolic wastewater treatment method. The present invention is mainly intended to solve the problems of corrosion, scaling and overheating of the reactor in the system, the coking and blocking at a preheating stage, difficult implementation of self-heating reaction for a concentration of organic wastewater (particularly phenolic wastewater), high energy consumption input of the system and the like.

To this end, the following technical solutions are adopted by the present invention.

A reactor based on supercritical water oxidation provided by the invention includes an inner shell and an outer shell; and the inner shell is coaxially disposed in the outer shell.

The inner shell is divided into two portions, namely an upper cylinder and a lower cone; the cylinder includes an upper segment of imporous pipe and a lower segment of straight porous pipe; and the cone is a conical porous wall.

The outer shell includes an upper connection flange, a middle straight pressure-bearing wall and a lower conical pressure-bearing wall.

A first annular space is formed between the cylindrical portion of the inner shell and the straight pressure-bearing wall and the connection flange; a second annular space is formed between the conical porous wall and the conical pressure-bearing wall; a separation ring is disposed between the first annular space and the second annular space; high-temperature evaporated water injection pipes are disposed on an upper portion of the straight pressure-bearing wall; low-temperature evaporated water injection pipes are disposed on an upper portion of the conical pressure-bearing wall; and an outlet pipe is disposed at a bottom of the conical pressure-bearing wall.

A nozzle pipe is coaxially disposed on the connection flange, and the nozzle pipe passes through a top center of the inner shell.

Further, water outlets of the high-temperature evaporated water injection pipes are directly faced to a middle-upper portion of the imporous pipe; and water outlets of the low-temperature evaporated water injection pipes are directly faced to the separation ring.

Further, the nozzle pipe includes an outer pipe and an inner pipe; and a length that the outer pipe is stretched into a reaction zone is 20-200 mm longer than the inner pipe.

During work, since a nozzle of the nozzle pipe has a jet entrainment function, the backflow and backmixing are easily occurred for materials on an upper portion of the reactor. In order to prevent the materials from diffusing to the straight porous pipe or even to an annular space between the straight porous pipe and the straight pressure-bearing wall, the imporous pipe extends downward along an outlet of the nozzle pipe and the extending distance is 2-6 times of an inner diameter of the outer pipe.

Preferably, the nozzle pipe further includes a middle pipe; and the outer pipe and the middle pipe are stretched into the reaction zone in a flush manner.

Further, the connection flange includes an upper flange and a lower flange; and the upper flange and the lower flange are connected via a bolt.

Preferably, a sealing ring is further disposed at a junction of the upper flange and the lower flange.

Further, an elastic support frame is disposed at a lower end of the straight porous pipe; and the elastic support frame is supported by the separation ring.

Further, 2-4 high-temperature evaporated water injection pipes are uniformly distributed along the periphery, and 2-4 low-temperature evaporated water injection pipes are also uniformly distributed along the periphery.

A reaction system based on supercritical water oxidation includes: a wastewater branch, a flue branch, an evaporated water branch, an oxygen branch and the above-mentioned reactor.

The wastewater branch includes a wastewater pool, a pretreatment device and a concentration system that are sequentially connected; and a concentrated waste liquid outlet of the concentration system is connected with a concentrated wastewater inlet pipe of the reactor.

The fuel branch passes through a first heat exchange device and then is connected to a fuel inlet of the reactor.

The evaporated water branch includes an evaporated water tank; outlet pipelines of the evaporated water tank are divided into an upper evaporated water branch and a lower evaporated water branch; the upper evaporated water branch sequentially passes through a second adjustment valve and a second heat exchange device and then is connected with a high-temperature evaporated water inlet pipeline of the reactor; and the lower evaporated water branch passes through a first adjustment valve and then is connected to a low-temperature evaporated water inlet of the reactor.

The oxygen branch is connected to an oxygen inlet of the reactor.

Further, an output end of the concentration system is divided into a first branch and a second branch; the first branch is connected to a concentrated wastewater inlet of the reactor; and the second branch is converged with the upper evaporated water branch, passes through the second heat exchange device and then is connected to a high-temperature evaporated water inlet of the reactor.

Further, the first heat exchange device includes a first preheater and a first heater that are sequentially connected; the second heat exchange device includes a second preheater and a second heater that are sequentially connected; and certain ends of the first preheater and the second preheater are respectively connected to a reaction fluid outlet of the reactor, and are configured to recycle the heat energy of a high-temperature fluid flowed out from the reaction fluid outlet.

Further, the reaction system further includes an energy recycling device; and the energy recycling device may be configured to directly recycle the heat energy and pressure energy of the high-temperature and high-pressure reaction fluid flowed out from the reaction fluid outlet.

The other ends of the first preheater and the second preheater are connected with one end of the energy recycling device; and the energy recycling device is configured to secondarily recycle the energy of the high-temperature reaction fluid.

Further, the energy recycling system may further be connected with the concentration system to exchange the heat, thereby providing the energy for the concentration system.

The other end of the energy recycling device may pass through a backpressure adjustment valve and then is connected with a separator.

The concentration system mainly implements the concentration of the wastewater to generate highly-concentrated waste liquid and purified water; and an adoptable concentration device includes any one of a low-temperature multi-effect distillation system, a reverse osmosis system, a nanofiltration system, a Mechanical Vapor Recompression (MVR) system, a membrane distillation system and the like.

Further, the concentration system is the low-temperature multi-effect distillation system; and the low-temperature multi-effect distillation system includes a third preheater, a low-temperature multi-effect distillator and a circulating pump.

The energy recycling device includes a first heat exchanger, a second heat exchanger and an ejector that are sequentially connected.

An outlet of the ejector is connected with the separator via the backpressure adjustment valve.

The first heat exchanger is sequentially connected with the circulating pump and the third preheater to form a circulation loop for heating a medium; in the circulation loop for heating the medium, the circulation medium is taken as a heating source of a first-effect heater first and then preheats the wastewater; the second heat exchanger is configured to further heat cooling water after the heat exchange of the concentration system; and the ejector is configured to maintain a low-pressure state inside the low-temperature multi-effect distillator.

Further, the concentration system is the reverse osmosis system; the reverse osmosis system includes a wastewater boosting pump and a reverse osmosis membrane component that are sequentially connected; the energy recycling device includes a first heat exchanger and a pressure energy recycler that are sequentially connected; and the pressure energy recycler is disposed on a pipeline between the wastewater boosting pump and the pretreatment device.

Because of the reaction fluid (P>22.1 MPa and temperature=300-350° C.) at the outlet of the reactor, the reaction system can be organically coupled with a preheating state and a concentration stage in supercritical water oxidation, thereby providing the heat energy and pressure energy for the concentration stage and the preheating stage and reducing the system energy consumption.

A phenolic wastewater treatment method includes the following steps.

Step 1, an appropriate alkaline medicament is added to phenolic wastewater to treat preliminarily to form a corresponding phenolic organic salt and then the phenolic organic salt is purified via a pretreatment device.

Step 2, the pretreated wastewater is charged to a concentration system to obtain concentrated wastewater and purified water.

Step 3, the concentrated wastewater obtained in the step 2 is pressurized to enter a reactor; oxygen injected into the reactor is mixed with a fuel to combust for combustion supporting, so that the concentration wastewater is formed into a hydrothermal flame to implement water oxidative degradation; and meanwhile, the evaporated water at upper and lower evaporated water branches is respectively injected into the reactor to protect the reactor.

Step 4, after the wastewater is degraded via water oxidative reaction, a product is discharged from a reaction fluid outlet at a bottom of the supercritical reactor.

Further, the alkaline medicament is a substance capable of being formed into the organic salt with phenols, and the formed phenolic organic salt is easily dissolved in water; and the alkaline medicament includes a sodium hydroxide, a calcium hydroxide, a sodium carbonate, etc.

Further, the fuel is an organic solution with low viscosity and low molecular weight, such as a waste solution combined by one or more of a methanol, an ethanol and a formic acid.

The present invention has the following beneficial effects.

With the reaction device of the present invention, the evaporated water is distributed uniformly, so that the inhibition of the evaporated water to central reaction in work is prevented; and meanwhile, the evaporated water can take a very good protective effect to partial porous inner shell.

With the unique design (the double-shell reactor, the coaxial nozzle, the inner shell structure, the evaporated water injection pipes and the like) of the supercritical water oxidation reactor, it is assured that the wastewater is injected into the reactor at a room temperature and is degraded thoroughly; moreover, the wastewater is injected into the reactor via the sidewall, so the corrosion, salt deposition and local overheating inside the reactor are prevented and the reaction process is guaranteed to be stable and reliable.

In the present invention, the wastewater is concentrated via the concentration device to generate the highly concentrated waste liquid and the purified water; with the improved concentration of the organic matters in the concentrated solution, a higher reaction temperature is produced to accelerate the oxidative degradation of the organic matters, improve the degradation efficiency and implement the self-heating in the reaction process; the purified water is injected as the high-temperature evaporated water to protect the reactor, so that the consumption of the evaporated water of the system is reduced; and furthermore, after a small amount of organic matters in the purified water enters the reactor, the organic matters are mixed with a high-temperature fluid to further oxidatively degrade under the high-temperature condition, thus guaranteeing the discharge standard of the wastewater.

By adding the alkali to neutralize and dissolve the phenolic wastewater, a phenolic compound is converted into an organic salt with high solubility and simultaneously the problems of volatilization or membrane pollution of the organic matters in the subsequent concentration process is prevented.

By adding the auxiliary fuel and injecting the auxiliary fuel into the supercritical water oxidation reactor, and forming the hydrothermal flame in the reactor, the concentrated waste liquid injected into the reactor at the room temperature is preheated to the supercritical reaction temperature and thus the problems such as coking and scaling of the waste liquid at the preheating state are prevented.

The pressure energy and heat energy of the reaction fluid in the reactor are comprehensively recycled via the energy recycling device, so that the energy is provided for the concentration system and the supercritical water oxidation system, and energy consumption of the system is reduced.

Numerals in the drawings: 1—wastewater pool, 2—medicament adding device, 3—pretreatment device, 4—concentration system, 041—third preheater, 042—first-effect heater; 043—condenser, 044—low-temperature multi-effect distillator, 045—circulating pump, 0042—wastewater boosting pump, 0043—reverse osmosis membrane component, 5—fuel tank, 6—evaporated water tank, 7—fuel pump, 8—concentrated wastewater pump, 9—purified water pump, 10—first heat exchange device, 1001—first preheater, 1002—second preheater, 11—second heat exchange device, 1101—second preheater, 1102—second heater, 12—oxidation tank, 13—oxygen boosting pump, 14—reactor, 1401—nozzle pipe, 01—inner pipe, 02—middle pipe, 03—outer pipe, 1402—high-temperature evaporated water injection pipe, 1403—straight pressure-bearing wall, 1404—straight porous pipe, 1405—separation ring, 1406—low-temperature evaporated water injection pipe, 1407— conical porous wall, 1408—outlet pipe, 1409—conical pressure-bearing wall, 1410—elastic support frame, 1411—imporous pipe, 1412—lower flange, 1413—sealing ring, 1414—bolt, 1415—upper flange, a—fuel inlet, b—oxygen inlet, c—concentrated wastewater inlet, d—high-temperature evaporated water inlet, e—low-temperature evaporated water inlet, f—reaction fluid outlet, 15—first adjustment valve, 16—second adjustment valve, 17—evaporated water pump, 18—energy recycling device, 1801—first heat exchanger, 1802—second heat exchanger, 1803—ejector, 1804—pressure energy recycler, 19—backpressure adjustment valve, 20—separator.

DETAILED DESCRIPTION OF THE EMBODIMENTS

To make the objectives, technical solutions and advantages of the present invention clearer, a clear and complete description of the technical solutions in the present invention will be given below in combination with the embodiments of the present invention. It is to be noted that the embodiments described below are a part, but not all, of the embodiments of the present invention. All of the other embodiments, obtained by a person of ordinary skill in the art based on the embodiments of the present invention without any inventive efforts, fall into the protection scope of the present invention.

Embodiment 1

In this embodiment, the phenolic wastewater is selected in use and after the phenolic wastewater is treatment by the system of the present invention, the discharge standard of the phenol is required to be lower than 0.5 mg/L.

Figure 1:
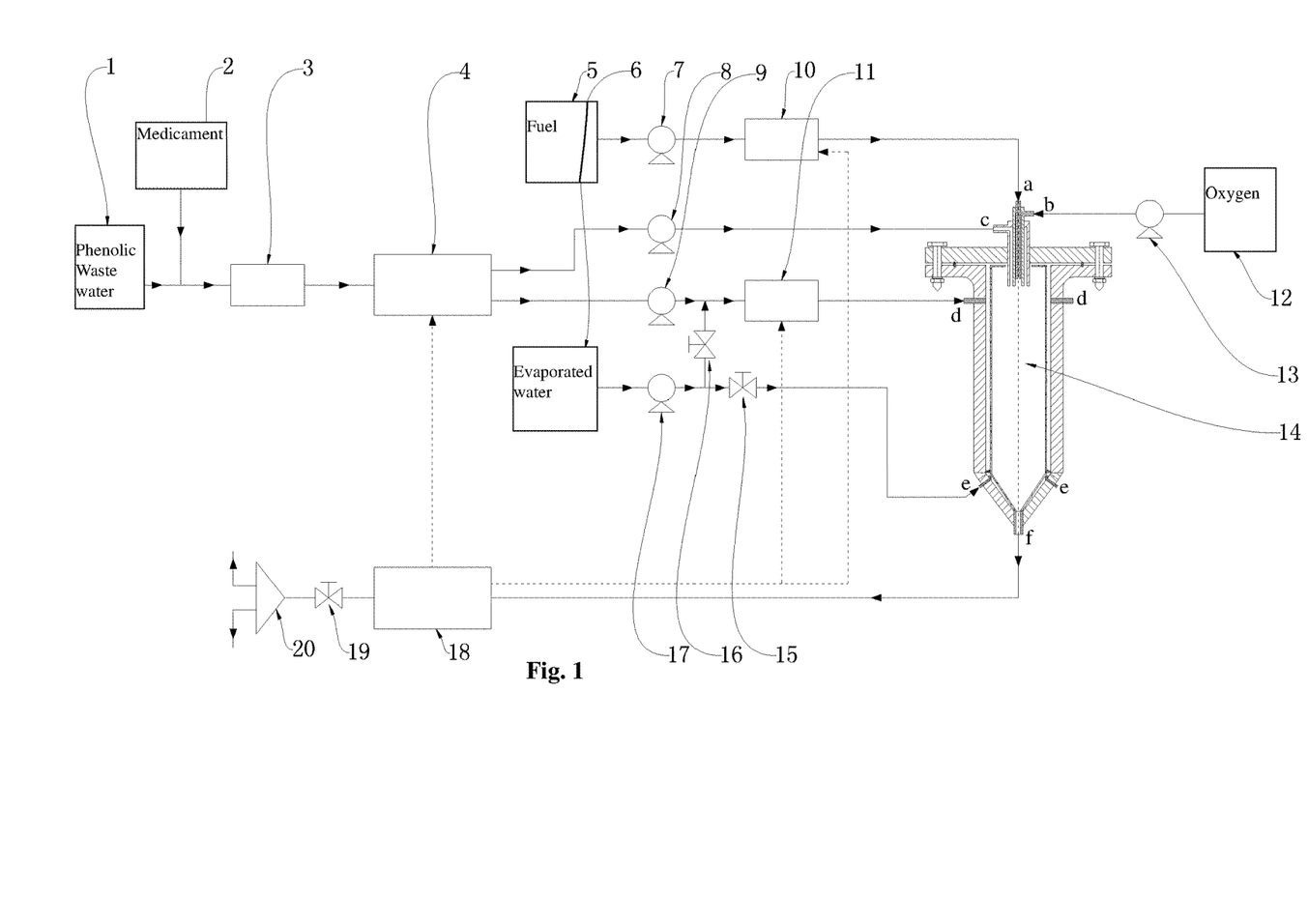
FIG. 1 is a structural schematic diagram of a reaction system based on supercritical water oxidation provided by the present invention.

As shown in FIG. 1, a reaction system based on supercritical water oxidation provided by the present invention includes: a wastewater branch, a flue branch, an evaporated water branch, an oxygen branch and a reactor 14.

The wastewater branch includes a wastewater pool 1, a pretreatment device 3 and a concentration system 4 that are sequentially connected; a concentrated waste liquid outlet of the concentration system 4 is connected with a concentrated wastewater inlet c pipeline of the reactor 14; and the fuel branch passes through a first heat exchange device 10 and then is connected to a fuel inlet a of the reactor 14.

The evaporated water branch includes an evaporated water tank 6; an outlet of the evaporated water tank 6 is pressurized by using an evaporated water pump 17 and is divided into an upper evaporated water branch and a lower evaporated water branch; the upper evaporated water branch sequentially passes through a second adjustment valve 16 and a second heat exchange device 11 and then is connected with a high-temperature evaporated water inlet d pipeline of the reactor 14; and the lower evaporated water branch passes through a first adjustment valve 15 and then is connected to a low-temperature evaporated water inlet e of the reactor 14.

The oxygen branch is connected to an oxygen inlet b of the reactor 14; and an oxygen boosting pump 13 is disposed on the oxygen branch to take as a conveying power source.

Figure 5:
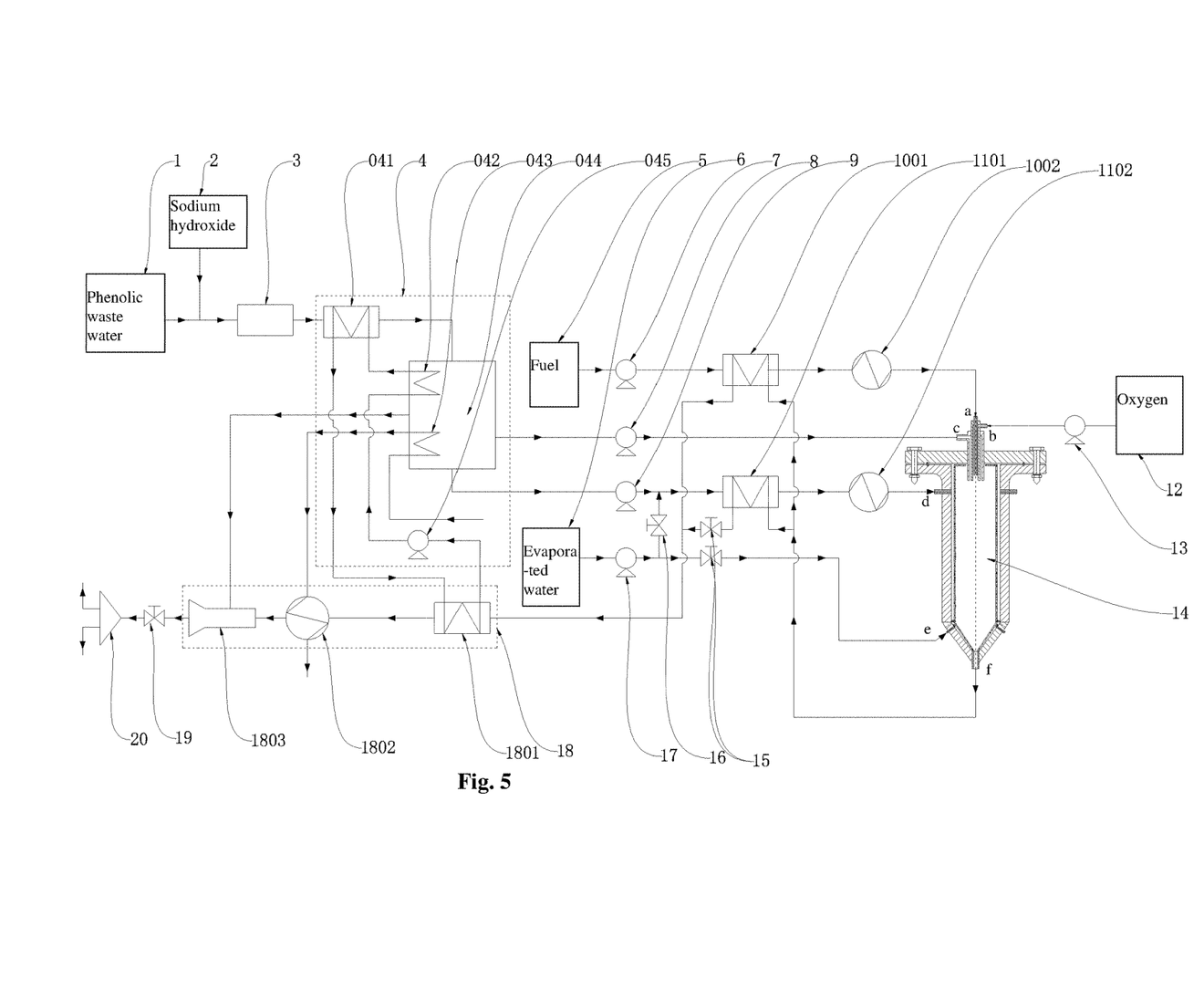
FIG. 5 is an overall structural schematic diagram of a reaction system based on supercritical water oxidation in a first embodiment.

As shown in FIG. 5, in order to further reduce the energy consumption of the system to recycle the heat energy of a reaction fluid of the reactor 14 and further ensure the temperature requirement when the fuel and evaporated water enter the reactor 14, the first heat exchange device 10 and the second heat exchange device 11 are provided as follows in the present invention.

The first heat exchange device 10 includes a first preheater 1001 and a first heater 1002; the first preheater 1001 and the first heater 1002 are sequentially connected; the first preheater 1001 is configured to enable a fuel conveyed from a fuel pump 7 to exchange the heat with a high-temperature reaction fluid, so that the fuel is preheated preliminarily; and the first heater 1002 is configured to further heat the preheated fuel, so as to ensure that the fuel meets the temperature requirement before entering the reactor 14.

The second heat exchange device 11 includes a second preheater 1101 and a second heater 1102 that are sequentially connected; the second preheater 1101 is configured to enable the evaporated water to exchange the heat with the reaction fluid, so that the evaporated water is preheated preliminarily; and the second heater 1102 is configured to further heat the preheated evaporated water, and the evaporated water having the temperature up to the standard enters the reactor 14.

In order to further improve the heat energy recycling rate of the reaction fluid, the reaction fluid of which the heat is exchanged via the first preheater 1001 and the second preheater 1101 respectively is recycled in an energy recycling device 18 as a secondary energy.

In this embodiment, the concentration system 4 is a low-temperature multi-effect distillation system; and the low-temperature multi-effect distillation system includes a third preheater 041, a low-temperature multi-effect distillator 044 and a circulating pump 045.

The energy recycling device 18 includes a heat exchanger 1801, a second heat exchanger 1802 and an ejector 1803 that are sequentially connected.

The ejector 1803 is configured to maintain a low-pressure state inside the low-temperature multi-effect distillator 044; an outlet of the ejector 1803 is sequentially connected to a backpressure adjustment valve 19 and a separator 20; and the low-temperature reaction fluid of which the heat energy is recycled secondarily performs gas-liquid separation in the separator 20 to discharge from the system.

The first heat exchanger 1801 is sequentially connected with the circulating pump 045 and the third preheater 041 to form a circulation loop for heating a medium; the reaction fluid flowed out from the first preheater 1001 and the second preheater 1101 after the heat exchange exchanges the heat with the circulating medium via the first heat exchanger 1801; the heated circulating medium is taken as a heat source of a first-effect heater 042 of the low-temperature multi-effect distillator 044 first, and then the circulating medium after the heat exchange of the first-effect heater 042 preheats the wastewater via the third preheater 041; and after the secondary heat exchange, the circulating medium is returned to the first heat exchanger 1801 for circulating.

The vapor produced by the last effect of the low-temperature multi-effect distillator 044 discharges the heat and is condensed in the condenser 043. The cooling water enters the condenser 043 to condense the vapor and then further exchanges the heat with the second heat exchanger 1802 to absorb the heat to heat; and at last, the heated cooling water is taken as hot water to supply the heat to the outside.

The reaction fluid of which the heat is exchanged by the second heat exchanger 1802 and the energy is recycled via the ejector 1803 is treated by the separator 20 to discharge from the system.

Figure 2:
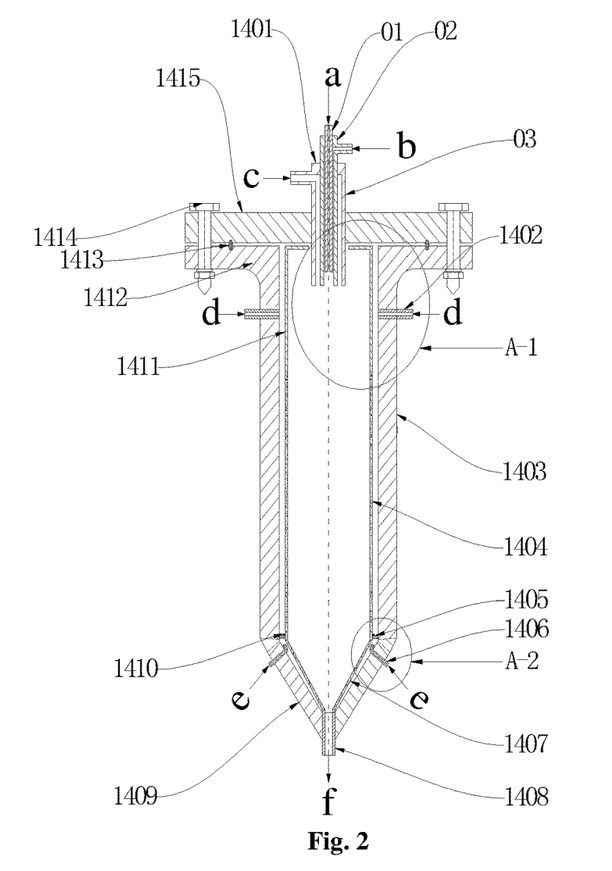
FIG. 2 is an overall structural schematic diagram of a reactor provided by the present invention.
Figure 3:
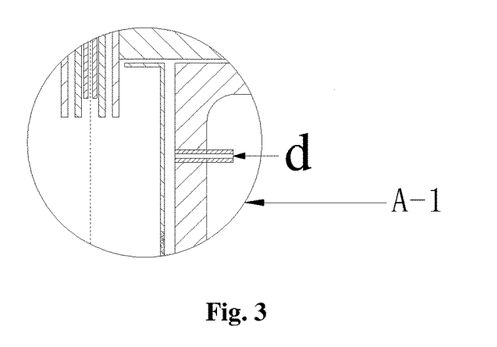
FIG. 3 is a local enlarged diagram at A-1 in FIG. 2.
Figure 4:
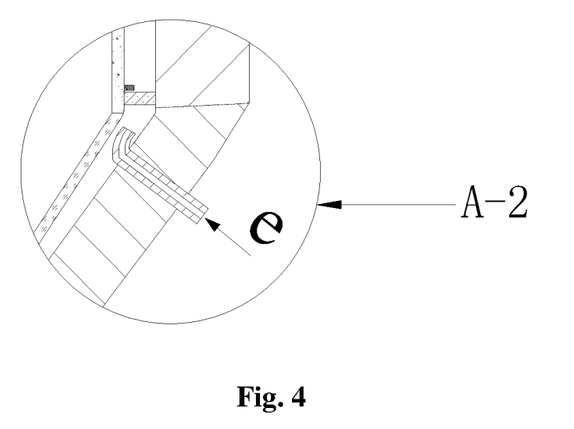
FIG. 4 is a local enlarged diagram at A-2 in FIG. 2.

As shown in FIG. 2 to FIG. 4, a reactor based on supercritical water oxidation provided by the present invention includes an inner shell and an outer shell; and the inner shell is coaxially disposed in the outer shell.

The inner shell is divided into two portions, namely an upper cylinder and a lower cone; the cylinder includes an upper segment of imporous pipe 1411 and a lower segment of straight porous pipe 1404; and the cone is a conical porous wall 1407.

The outer shell includes an upper connection flange, a middle straight pressure-bearing wall 1403 and a lower conical pressure-bearing wall 1409.

A first annular space is formed between the cylindrical portion of the inner shell and the straight pressure-bearing wall 1403 and the connection flange; a second annular space is formed between the conical porous wall 1407 and the conical pressure-bearing wall 1409; a separation ring 1405 is disposed between the first annular space and the second annular space; high-temperature evaporated water injection pipes 1402 are disposed on an upper portion of the straight pressure-bearing wall 1403; low-temperature evaporated water injection pipes (1406) are disposed on an upper portion of the conical pressure-bearing wall 1409; and an outlet pipe 1408 is disposed at a bottom of the conical pressure-bearing wall 1409.

A nozzle pipe 1401 is coaxially disposed on the connection flange, and the nozzle pipe 1401 passes through a top center of the inner shell.

According to the reactor 14 provided by the present invention, the inner shell is taken as a temperature-bearing component and the outer shell is taken as a pressure-bearing component, i.e., the inner shell can bear the high temperature, corrosion and salt deposition but not the pressure, and the outer shell bears the pressure but not the high temperature. In this way, the outer shell does not need to be made of a high temperature and corrosion resistant material, so that the cost of the water oxidation reactor is significantly reduced.

Since the temperature of the reactor is gradually reduced from a supercritical temperature to a subcritical temperature from top to bottom, the material density is increased gradually and the volume is decreased suddenly, by setting the bottom of the reactor into a cone, the space of the reactor is saved. Furthermore, while the material volume is reduced, the flow velocity of the material may be kept, so that the low-velocity deposition phenomenon is prevented and the supercritical water oxidation reactor 14 is protected.

In light of high flow velocity and nonuniform distribution of the evaporated water at an injection port of the reactor in the conventional art, with the inner shell structure of the reactor in the present invention, under the condition of the limited number of the evaporated water injection pipes, the structure of the imporous pipe 1411 on the upper portion is beneficial to the uniform distribution of the evaporated water along a peripheral direction. Water outlets of the high-temperature evaporated water injection pipes 1402 in the present invention are faced to the imporous pipe 1411, so the high-temperature evaporated water inlets d of the high-temperature evaporated water injection pipes 1402 are prevented from being directly faced to the straight porous pipe 1404 to permeate intensively to cause the nonuniform distribution and the problem of vigorously inhibiting the central reaction, and the temperature of the inner shell is prevented from being distributed nonuniformly along the peripheral direction to cause local overheating and thermal stress.

Low-temperature evaporated water outlets of the low-temperature evaporated water injection pipes 1406 are directly faced to the separation ring 1405 and are specifically located on an upper portion of the conical pressure-bearing wall 1409. The low-temperature evaporated water is directly faced to the separation ring 1405 after being injected, so the impact on the lower conical porous wall 1407 is prevented and the uniform distribution of the low-temperature evaporated water can be implemented. The low-temperature evaporated water is distributed peripherally and longitudinally and then is permeated to the reactor from the conical porous wall 1407 to protect the wall and further cool the reaction fluid; and the cooled reaction fluid is flowed out from the reaction fluid outlet f of the outlet pipe 1408.

The nozzle pipe 1401 includes an outer pipe 03 and an inner pipe 01; and a length that the outer pipe 03 is stretched into a reaction zone is 20-200 mm longer than the inner pipe 01.

During work, since a nozzle has a jet entrainment function, the backflow and backmixing are easily occurred for materials on an upper portion of the reactor. In order to prevent the materials from diffusing to the straight porous pipe 1404 or even to an annular space between the straight porous pipe 1404 and the straight pressure-bearing wall 1403, the imporous pipe 1411 in the present invention extends downward along an outlet of the nozzle pipe 1401 and the extending distance is 2-6 times of an inner diameter of the outer pipe 03.

With the nozzle pipe 1401, the coaxial nozzle pipe 1401 may be prevented from being overheated, and simultaneously a space is provided for the fuel and oxygen for mixing, preheating and reacting. The fuel and the oxygen take place the supercritical water oxidative reaction at an outlet of the inner pipe 01 of the nozzle pipe 1401, thereby producing a high-temperature hydrothermal flame. The concentrated waste liquid injected at a room temperature may be preheated to a supercritical reaction temperature to prevent the preheating problem of the concentrated waste liquid and provide a higher reaction temperature for the concentrated waste liquid, so that the highly toxic wastewater (such as the phenolic wastewater) is degraded thoroughly and the requirement of the high discharge standard is met.

In this embodiment, an auxiliary fuel is adopted to inject into the supercritical water oxidation reactor 14. By forming the hydrothermal flame in the reactor, the concentrated waste liquid injected into the reactor at the room temperature s preheated to the supercritical reaction temperature, so the waste liquid is prevented from coking and scaling at a preheating stage. The nozzle pipe 1401 further includes a middle pipe 02; and the outer pipe 03 and the middle pipe 02 are stretched into the reaction zone in a flush manner. The wastewater is injected into the water oxidation reactor 14 via the outer pipe 03, the oxygen is injected via the middle pipe 02 and the fuel is injected into the water oxidation reactor 14 via the inner pipe 01. The fuel and oxygen are mixed and combusted in the middle pipe 02 first to take the combustion supporting effect to the wastewater, so that the high-temperature wastewater forms the hydrothermal flame and reaches to a condition of the supercritical water oxidative reaction for reaction and degradation; and the reaction product is discharged from a reaction fluid outlet f at a bottom of the reactor 14.

More specifically, the connection flange includes an upper flange 1415 and a lower flange 1412; and the upper flange 1415 and the lower flange 1412 are connected via a bolt 1414, and a washer may be provided at the junction.

A plurality of (such as 2-4) high-temperature evaporated water injection pipes 1402 are uniformly distributed along the periphery; and a plurality of (such as 2-4) low-temperature evaporated water injection pipes are also uniformly distributed along the periphery.

An elastic support frame 1410 is disposed at a lower end of the straight porous pipe 1404; and the elastic support frame 1410 is supported by the separation ring 1405.

In order to further improve the sealing effect inside the reactor and prevent the gas leakage phenomenon in work, a sealing ring 1413 is further disposed at the junction of the upper flange 1415 and the lower flange 1412.

In work, when the high-temperature evaporated water is injected into the first annular space and is sprayed to the imporous pipe 1411 at the upper portion of the inner shell, a part of evaporated water flowing upward wraps the imporous pipe 1411 to scour, cool and protect the imporous pipe 1411 and the nozzle pipe 1401. Most high-temperature evaporated water is distributed on the horizontal periphery, is flowed downward by virtue of a gravity action to distribute uniformly, and is permeated into the reaction zone via the straight porous pipe 1404 to protect the wall and cool the reaction fluid. The low-temperature evaporated water is directly faced to the separation ring 1405 after being injected, so the impact on the lower conical porous wall 1407 is prevented and the uniform distribution of the low-temperature evaporated water can be implemented. The low-temperature evaporated water is distributed peripherally and longitudinally and then is permeated to the reactor from the conical porous wall 1407 to protect the wall and further cool the reaction fluid; and the cooled reaction fluid is flowed out from the reaction fluid outlet f of the outlet pipe 1408.

When the above-mentioned reaction system is adopted to treat the phenolic wastewater, the system operates as follows.

First of all, the phenols are difficultly dissolved in water, so an appropriate sodium hydroxide is added to the phenolic wastewater to neutralize and dissolve the phenolic wastewater to form an organic salt. The alkali adding step may be operated in front of a pretreatment device 3, and a medicament adding device 2 is additionally provided. The wastewater neutralized by an alkaline medicament is purified in the pretreatment device 3 to remove substances such as suspended matter and precipitate. The phenolic wastewater is treated preliminarily by the sodium hydroxide, so that phenolic components in dissolved, suspended and precipitated states are converted into high-solubility salts. Moreover, problems in a concentration process may be prevented, such as high volatility of the phenolic substances in evaporation and concentration processes, and membrane pollution of organic matters in a membrane concentration process.

Then, the pretreated wastewater is charged to a low-temperature multi-effect distillator 044 to obtain concentrated wastewater and purified water.

The concentrated wastewater is pressurized to enter the reactor 14. The concentrated wastewater and the fuel take place the sypercritical water oxidative reaction at an inner pipe 01 of a nozzle pipe 1401 via oxygen injected into the reactor 14 to produce the high-temperature hydrothermal flame. The concentrated waste liquid injected at a room temperature may be preheated to the supercritical reaction temperature to implement water oxidative degradation, so that the problems of corrosion, scaling, coking and high energy consumption of the concentrated waste liquid in the preheating process are prevented, the effect that the wastewater is injected into the reactor at the room temperature is implemented, and a higher reaction temperature is provided for the concentrated waste liquid. In addition, the carbon dioxide produced by the auxiliary fuel in the oxidative reaction is reacted with a part of salts in the waste liquid again to convert into phenols; and under the high-temperature state, the phenols and the organic salts are oxidized thoroughly into nontoxic and harmless carbon dioxide and water, thereby meeting the requirement of the high discharge standard.

Additionally, after the wastewater is concentrated and separated by the concentration system 4, a certain amount of purified water is formed. In order to fully utilize the purified water output by the low-temperature multi-effect distillator 044, the purified water is converged with an upper evaporated water branch via a purified water pump 9, and enters a second preheater 1101 via a second adjustment valve 16. The temperature at which the high-temperature evaporated water is injected into the reactor 14 is 200-400° C. generally. After the high-temperature evaporated water is injected into the reactor, the high-temperature evaporated water may be fully mixed with a central high-temperature reaction fluid to react, so that it is assured that the small amount of organic matters contained in the purified water produced by the concentration system 4 may also be thoroughly degraded, thereby meeting the requirement of the high discharge standard.

At last, the product after the degradation reaction of the wastewater is discharged from the reaction fluid outlet f at the bottom of the reactor 14; the heat energy is recycled stage by stage first, and then after the product is separated by a separator 20, the gas and liquid reaching the standard are discharged directly.

Embodiment 2

In this embodiment, the phenolic wastewater is selected in use and after the phenolic wastewater is treatment by the system of the present invention, the discharge standard of the phenol is required to be lower than 0.5 mg/L. During the phenolic wastewater treatment in this embodiment, the added alkaline medicament is a sodium carbonate.

Figure 6:
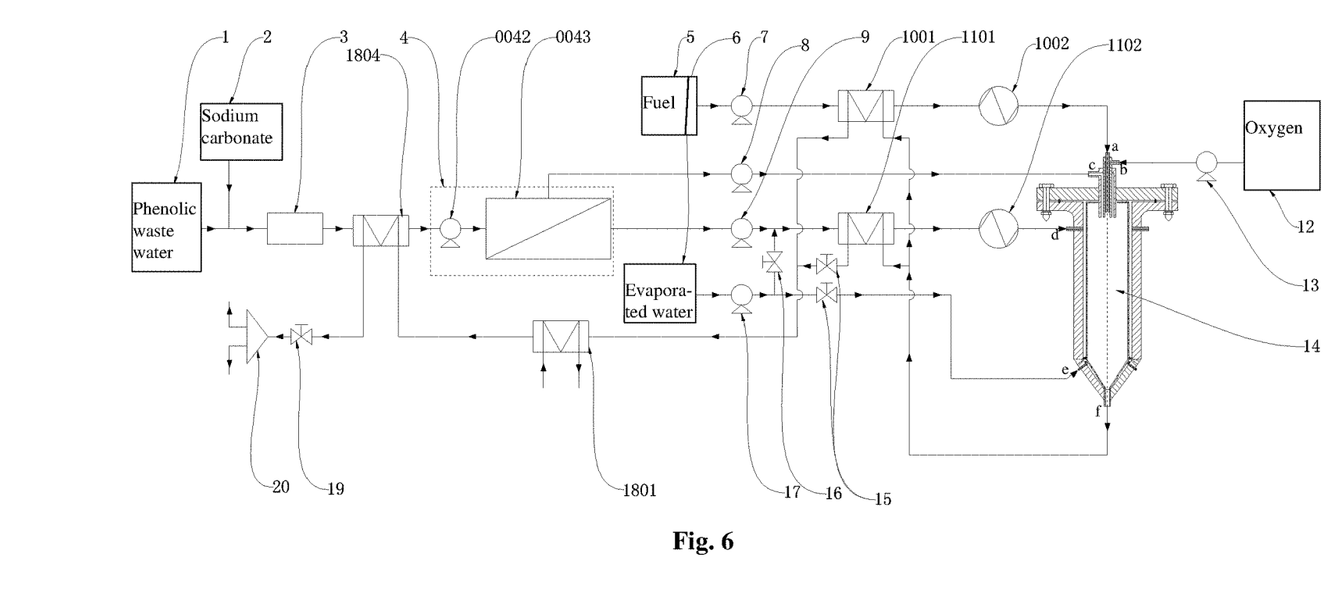
FIG. 6 is an overall structural schematic diagram of a reaction system based on supercritical water oxidation in a second embodiment.

The distinguishing feature of this embodiment from the treatment system of the first embodiment lies in that a concentration system 4 and an energy recycling device 18 are provided differently.

As shown in FIG. 6, the concentration system 4 in this embodiment includes: a wastewater boosting pump 0042 and a reverse osmosis membrane component 0043 that are sequentially connected. The energy recycling device 18 includes a first heat exchanger 1801 and a pressure energy recycler 1804 that are sequentially connected. The pressure energy recycler 1804 is disposed on a pipeline between the wastewater boosting pump 0042 and the pretreatment device 3.

In operation, the phenolic wastewater is heated and pressurized via the pressure energy recycler 1804 and the wastewater boosting pump 0042 sequentially and then enters the reverse osmosis membrane component 0043; and the wastewater concentrate and the purified water are obtained from the reverse osmosis membrane component 0043.

The energy recycling process is as follows: the reaction fluid flowed out after the heat exchange of the first preheater 1001 and the second preheater 1101 passes through the energy recycling device 1801 first to recycle the heat energy, and then passes through the pressure energy recycler 1804 to exchange the energy with the pretreated wastewater to recycle the pressure energy thereof. The reaction fluid of which the heat energy is recycled secondarily performs gas-liquid separation via the separator 20 to discharge from the system.

The above embodiments merely express several implementation manners of the present invention, so the description is specific and detailed but cannot be understood as the limit to the scope of the present invention thereto. It is to be noted that a person of ordinary skill in the art may further make a plurality of variations and improvements without departing from a concept of the present invention, and these variations and improvements all pertain to the scope of protection of the present invention. Accordingly, the scope of protection of the present invention should be subject to the appended claims.

What is claimed is:

1. A reactor based on supercritical water oxidation, comprising an inner shell and an outer shell, wherein the inner shell is coaxially disposed in the outer shell;

the inner shell is divided into two portions, namely an upper cylinder and a lower cone; the cylinder comprises an upper segment of imporous pipe (1411) and a lower segment of straight porous pipe (1404); and the cone is a conical porous wall (1407);

the outer shell comprises an upper connection flange, a middle straight pressure-bearing wall (1403) and a lower conical pressure-bearing wall (1409);

a first annular space is formed between the cylindrical portion of the inner shell and the straight pressure-bearing wall (1403) and the connection flange; a second annular space is formed between the conical porous wall (1407) and the conical pressure-bearing wall (1409); a separation ring (1405) is disposed between the first annular space and the second annular space; high-temperature evaporated water injection pipes (1402) are disposed on an upper portion of the straight pressure-bearing wall; low-temperature evaporated water injection pipes (1406) are disposed on an upper portion of the conical pressure-bearing wall (1409); and an outlet pipe (1408) is disposed at a bottom of the conical pressure-bearing wall (1409);

a nozzle pipe (1401) is coaxially disposed on the connection flange, and the nozzle pipe (1401) passes through a top center of the inner shell.

2. The reactor based on the supercritical water oxidation as claimed in claim 1, wherein water outlets of the high-temperature evaporated water injection pipes (1402) are directly faced to a middle-upper portion of the imporous pipe (1411); and water outlets of the low-temperature evaporated water injection pipes (1406) are directly faced to the separation ring (1405).

3. The reactor based on the supercritical water oxidation as claimed in claim 1, wherein the nozzle pipe (1401) comprises an outer pipe (03) and an inner pipe (01); and a length that the outer pipe (03) is stretched into a reaction zone is 20-200 mm longer than the inner pipe (01).

4. The reactor based on the supercritical water oxidation as claimed in claim 3, wherein the nozzle pipe (1401) further comprises a middle pipe (02); and the outer pipe (03) and the middle pipe (02) are stretched into the reaction zone in a flush manner.

5. The reactor based on the supercritical water oxidation as claimed in claim 3, wherein the imporous pipe (1411) extends downward along an outlet of the nozzle pipe (1401) and the extending distance is 2-6 times of an inner diameter of the outer pipe (03).

6. The reactor based on the supercritical water oxidation as claimed in claim 1, wherein an elastic support frame (1410) is disposed at a lower end of the straight porous pipe (1404); and the elastic support frame (1410) is supported by the separation ring (1405).

* * * * *